Sept. 12, 1933.  A. J. FAUSEK ET AL  1,926,438
TORCH
Filed Oct. 14, 1929  2 Sheets-Sheet 1

INVENTORS
A. J. FAUSEK
I. F. FAUSEK
BY
ATTORNEY

Sept. 12, 1933.  A. J. FAUSEK ET AL  1,926,438
TORCH
Filed Oct. 14, 1929   2 Sheets-Sheet 2
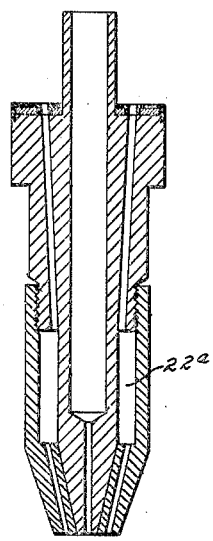
Fig. 4
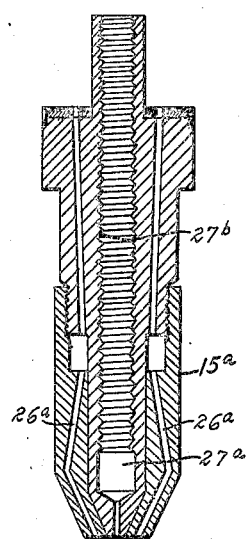
Fig. 5
Fig. 6
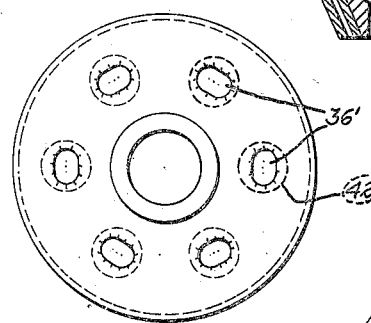
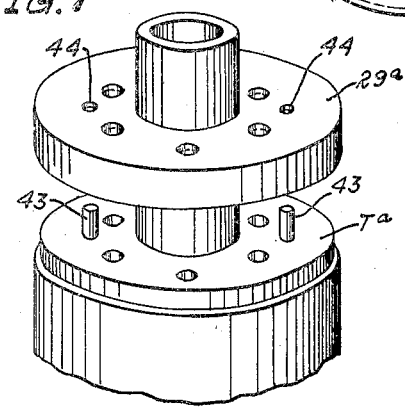
Fig. 7
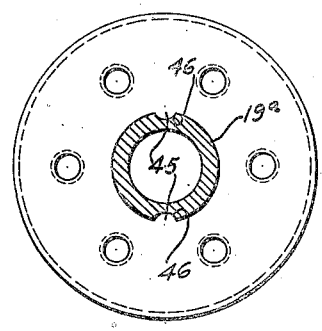
Fig. 8
INVENTORS
A. J. FAUSEK
I. F. FAUSEK
BY T. M. Harrington
ATTORNEY Patented Sept. 12, 1933

1,926,438

UNITED STATES PATENT OFFICE 1,926,438

TORCH

Arthur J. Fausek and Irwing F. Fausek,
St. Louis, Mo.

Application October 14, 1929. Serial No. 399,521

13 Claims. (Cl. 158—27.4)

This invention relates generally to gas burning torches and more specifically to an improved structure for the head or tip portion of such an apparatus, an important feature of the invention being to provide an improved gasket arrangement adapted for use at the junction of the head of the torch and the tip thereof whereby a fluid-tight joint will be produced at that point. The gasket of our improved torch is so constructed and arranged in the torch organization as to protect the compressible material thereof from the heat and flames of the torch and as a result of this arrangement the life of the gasket is very greatly prolonged.

Another important object of the invention is to provide an improved tip structure which in use serves to preheat the oxygen as it passes through the tip to the discharge end thereof.

Still another object of the invention is to provide a torch with an improved head structure.

Figure 4 is a section of a modified form of the tip illustrated in Figure 1.

Figure 5 is another modified form of the tip of our improved torch.

Figure 6 is an enlarged plan view of the gasket illustrated in Figure 3.

Figures 7 and 8 illustrate modified forms of the means for centering the gasket on the tip of the torch.

Figure 1:
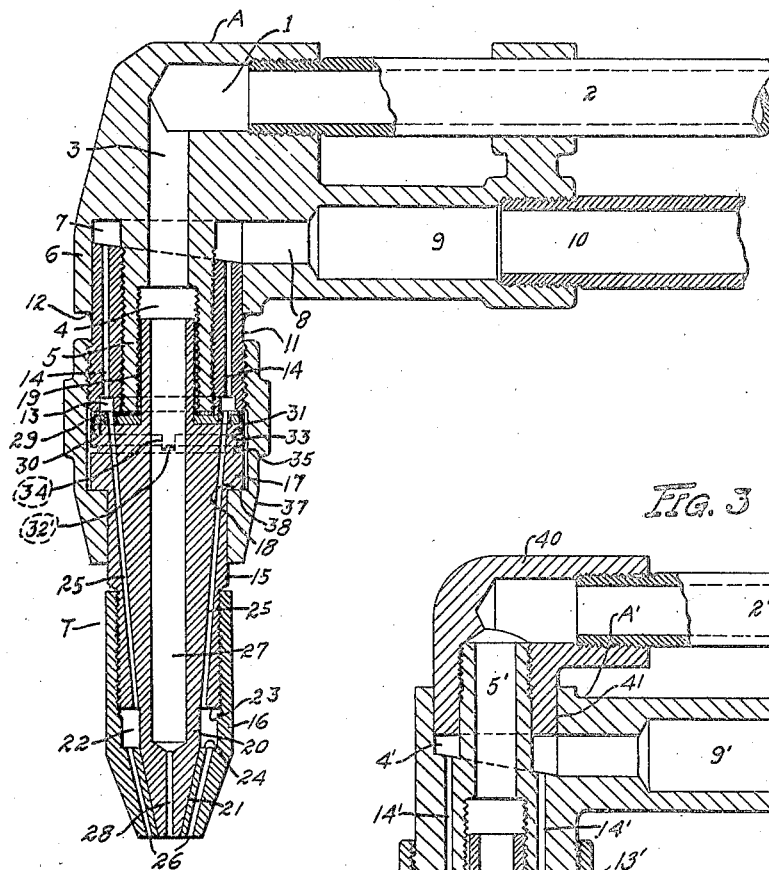
Figure 1 is a fragmentary section illustrating the head or tip portion of our improved torch.
Figure 2:
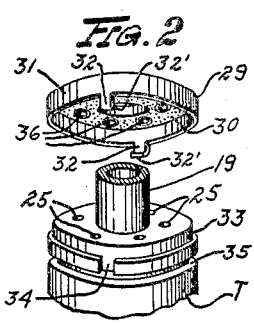
Figure 2 is a fragmentary perspective illustrating the manner of associating the gasket of our improved torch with the tip thereof.

In the drawings, wherein several embodiments of the invention are shown for the purpose of illustration merely, and referring particularly to Figures 1 and 2, A designates the head portion of a cutting torch, said head portion being provided with cavity 1 into which an oxygen conductor 2 leads. The cavity 1 communicates with an oxygen passageway 3, said oxygen passageway communicating at the end thereof opposite to the end located adjacent to the cavity 1 with a screw-threaded cavity 4. The screwthreaded cavity 4 is formed within a nipple 5 which extends outwardly from the head portion A and this nipple is screwthreaded on its outer surface. Arranged about the nipple 5 at the upper portion thereof in spaced relation with respect thereto is a wall 6 and the spaced relationship of this wall with respect to the upper portion of the nipple 5 provides an annular space 7 with which a gas passageway 8 communicates. The gas passageway 8 communicates with a slightly enlarged gas passageway 9 which receives at its outer end the screwthreaded end portion of a gas conductor 10, this last mentioned gas conductor leading from the mixing chamber of the torch wherein the fuel gas employed in the use of the torch is mixed.

11 designates an annular member which is screwthreaded throughout its length at its inner face and for a portion of its length at the outer face thereof, the last mentioned screwthreaded portion being located at the lower portion of the annular member. The annular member is screwed on the nipple 5 as shown in Figure 1, that is with the screwthreads on the inner face of the annular member engaging the screwthreads on the outer face of the nipple, and the upper portion of the annular member is extended into the annular space 7 in the head portion A. The annular member 11, after same has been screwed on the nipple 5 as described is secured by means of silver solder or other suitable material 12 to the head portion of the torch whereby a secure and fluid-tight joint is produced between said elements, and the upper edge of said annular member, which is extended at an angle with respect to the lower edge thereof, is arranged as shown in Figure 1 so as to provide a tapering annular space above the upper edge of the annular member. At its lower face the annular member 11 is provided with an annular recess 13, and 14 designates vertically disposed gas passageways which communicate at the upper ends thereof with the annular tapering space above the annular member 11 and at their lower ends with the annular recess 13.

T designates the tip of our improved torch, said tip comprising an upper portion 15 and a lower portion 16. The upper portion 15 of the tip is provided with an enlarged portion 17 the lower face of which provides a shoulder 18 and extended upwardly from said enlarged portion 17 is a stem 19 which is extended into the screwthreaded cavity 4 in the head portion A of the torch. The stem 19 is smooth but the cavity 4 is screwthreaded to receive tips of other types. The lower end portion of the portion 15 of the tip T is reduced slightly in diameter and is provided with screwthreads, and the lower portion 16 of said tip is screwed on said screwthreaded lower portion of said portion 15. At its lower end the tip portion 15 is provided with a downwardly extended stem 20 having a tapered lower end and the lower end portion of the tip portion 16 is provided with an aperture 21 into which the tapered lower end of the stem 20 is extended. 22 designates an annular space within the tip portion 16, said space being defined by the faces 23 and 24 of the tip portions 15 and 16 respectively, and the inner face of said tip portion 16 and the outer face of the stem 20. Extended longitudinally of the tip portion 15 at a slight angle with respect to the major axis thereof is a circular row of gas passageways 25, said gas passageways being open at the top face of the enlarged portion 17 of the tip portion 15 and communicating at their lower ends with the annular space 22. Also the lower portion of the tip portion 16 is provided with a circular row of gas passageways 26 which are open at the lower face of said tip portion 16 and communicate at their upper ends with the annular space 22. The angle of the gas passageways 26 with respect to the major axis of the tip is greater than the angle of the gas passageways 25 with respect to said major axis of said tip and as a result of this arrangement the heat of the flames issuing from the outer ends of the gas passageways 26 will be concentrated at a point a predetermined distance from the end of the tip.

27 designates an oxygen passageway which extends longitudinally through the tip portion 15 and stem 5. The oxygen passageway 27 is of substantial diameter throughout its length and at the lower end of the stem 20 we provide a passageway 28 of greatly reduced diameter when compared with the oxygen passageway 27 which communicates with said oxygen passageway.

Interposed between the top face of the enlarged portion 17 of the tip portion 15 and the lower faces of the nipple 5 and annular member 11 is a gasket 29 which comprises a disk of compressible material 30 having a central opening formed therethrough. The disk of compressible material 30 is located within a shell 31 formed preferably of soft metal, such as copper, and this shell is provided with a central opening arranged in registration with the central opening of the disk 30. The shell 31 is of greater depth than the disk 30 as shown in Figures 1 and 2 so that the annular side wall of the shell of the gasket extends downwardly a substantial distance below the lower face of the disk 30, and extended downwardly from the lower edge of the side wall of the shell 31 is a pair of diametrically opposed fingers 32 (Figure 2).

The upper portion of the tip portion 15 is provided with an annular recess 33 at the marginal edge of the top face of said tip portion, and opening into said annular recess and extending downwardly therefrom is a pair of diametrically opposed vertical grooves 34. 35 designates an annular groove formed in the circumferential face of the tip portion 15 at a point a slight distance below the annular recess 33, said annular groove being deeper than the annular recess 33 as shown clearly in Figure 1.

The top wall of the gasket shell 31 and the disk of compressible material 30 are provided with registering apertures 36 which are disposed in an arrangement corresponding to the arrangement of the gas passageways 25 in the tip portion 15 and the gasket 29 is associated with the top face of the tip portion 15 so that the apertures 36 are in registration with the upper ends of the gas passageways 25, and to insure such registration the gasket is arranged with respect to the top of the tip portion 15 so that when the gasket 29 is pressed downwardly on the tip portion 15 to cause the lower portion of the side wall of the gasket shell to embrace the top portion of said tip portion 15 by entering the recess 33, the fingers 32 will move downwardly in the vertical grooves 34. Such movement of the fingers 32 will positively register the apertures 36 with the upper ends of the gas passageways 25 and continued downward movement of the gasket 29 with respect to the tip portion 15 will cause the inwardly turned lower ends 32' of the fingers 32 to snap into the annular groove 35 whereby the gasket will be prevented from being disengaged from the tip portion 15 by moving upwardly with respect thereto. Also because the fingers 32 are disposed in the vertical grooves 34 rotation of the gasket with respect to the tip portion 15 is prevented. When the gasket is arranged in place in the torch the stem 19 on the tip portion 15 passes through the registering central openings in shell 31 and disk 30, and also the gas passageways 25 in said tip portion 15 communicate with the annular recess 13 at the lower end of the annular member 11 through the instrumentality of the apertures 36 formed through the gasket 29. An important feature of the invention resides in the fact that the metal of the gasket shell 31 surrounding the apertures formed through the top wall thereof is forced inwardly so as to provide a metal lining for the apertures 36 formed through the disk 30. This eliminates the likelihood that flame within the gas passageways 25 caused by back firing of the torch will burn the disk 30 of compressible material and thus destroy the gasket.

37 designates a nut by means of which the tip T is attached to the head portion A of the torch said nut having a shoulder 38 which engages the shoulder 18 on the tip portion 15, and said nut is screwed on the lower end of the annular member 11 as shown in Figure 1.

Figure 3:
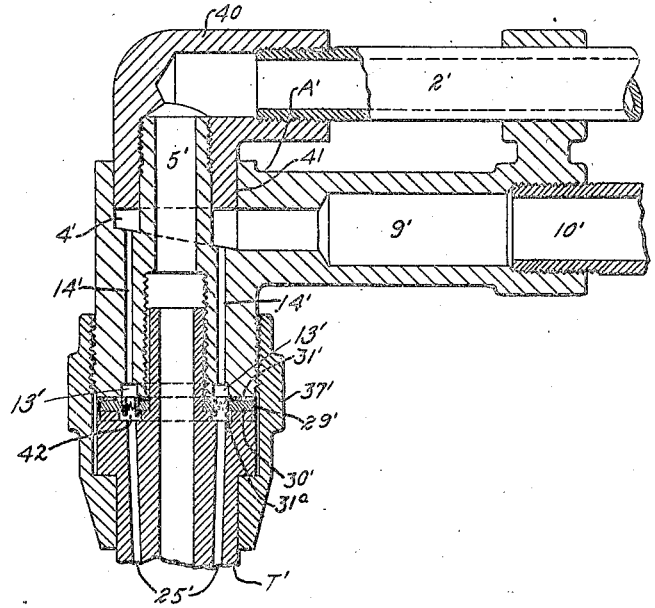
Figure 3 is a modified form of the invention illustrated in Figure 1.

In the form of the invention illustrated in Figure 3 the head portion A' is provided with a nipple 5' which extends upwardly from the main body of the head portion and an angle member 40 is screwed on the upper end of said nipple. The lower portion of the angle member 40 extends into an opening 41 formed at the top of the head portion and an oxygen conductor 2' is screwed into the outer end of said angle member. Below the lower end of the angle member 4 the head portion A' is provided with a tapering annular space 4' which communicates with a gas passageway into which a gas conductor 10' is screwed, and gas passageways 14' lead from said annular tapering space to the annular recess 13' at the lower end of the head portion A'. The tip T' is attached to the head portion A' by means of a nut 37' and to provide a fluid-tight joint between the lower end of the head portion and the top face of the tip T' we utilize a gasket 29'.

The gasket 29' is provided with elongated apertures 36' formed through the metal shell 31' and the disk 30' and the metal of the shell 31' is pressed downwardly into the apertures of the disk to line said apertures in the disk. Because of the shape of the apertures 36' the downwardly pressed metal of the shell which lines the apertures in the disk will be longer at the ends of the apertures than at the sides thereof, and these relatively long metal portions 31ª which extend below the lower face of the disk 30' extend into circular recesses 42 formed at the upper ends of the gas passageways 25' formed longitudinally through the tip T'. By placing the gasket 29' on the upper end of the tip so that the relatively long portions of the aperture lining metal are extended into the recesses 42 in the top face of the tip T' the apertures formed through the gasket 29' and the upper ends of the gas passageways 25' will be properly registered and said gasket will be maintained in its proper position on the tip T'.

In Figure 4 we illustrate a modified form of the tip in accordance with which the space 22ª is of much greater height than the corresponding space of the preferred form of the invention as illustrated in Figure 1.

In Figure 5 the tip portion 15ª is provided with gas passageways 26ª having a substantially V-shaped formation. In addition to this the oxygen passageway 27ª is provided with screwthreads 27ᵇ which increase the area of the wall of the oxygen passageway.

It will be noted that in each of the three forms of the tip the lower tip portion extends over approximately one-half of the entire tip. It will be noted also that in each case the oxygen passageway formed through the tip is of substantial diameter. The advantage of this arrangement is that the lower tip portion, which becomes very hot during operation of the torch, serves to heat the metal surrounding the oxygen passageway whereby the oxygen is preheated before its discharge from the outer end of the tip.

In Figure 7 we illustrate another means of positioning the gasket 29ª on the upper end of the tip Tª, said means comprising pins 43 which extend upwardly from the top face of the tip and extend into apertures 44 formed through the gasket.

In Figure 8 the gasket is provided with a plurality of projections 45 which extend into vertically disposed recesses 46 formed in the stem 19ª of the tip. By arranging the projections 45 in the recesses 46 as described registration of the apertures formed through the gasket with the gas passageways in the tip is assured.

We claim:

1. In combination with a torch of the class described having a head portion and a tip having a plurality of gas passageways formed therethrough, a gasket interposed between said head portion and said tip and provided with a plurality of apertures adapted for arrangement in coincidence with the gas passageways in said tip, said gasket comprising a disk of compressible material and a shell of soft metal within which said disk of compressible material is arranged, said shell having a portion arranged to embrace a portion of said tip.

2. In combination with a torch of the class described having a head portion and a tip having a plurality of gas passageways formed therethrough, a gasket interposed between said head portion and said tip and provided with a plurality of apertures adapted for arrangement in coincidence with the gas passageways in said tip, said gasket comprising a disk of compressible material, and a shell of soft metal within which said disk of compressible material is arranged, said shell being of greater depth than said disk of compressible material to provide a portion arranged to embrace a portion of said tip.

3. In combination with a torch of the class described having a head portion and a tip having a plurality of gas passageways formed therethrough, a gasket interposed between said head portion and said tip and provided with a plurality of apertures adapted for arrangement in coincidence with the gas passageways in said tip, said gasket comprising a disk of compressible material, and a shell of soft metal within which said disk of compressible material is arranged, portions of the metal of said shell adjacent to the apertures formed through the gasket being forced into said apertures in a manner to provide metallic linings for said apertures.

4. In combination with a torch of the class described having a head portion and a tip having a plurality of gas passageways formed therethrough, a gasket interposed between said head portion and said tip and provided with a plurality of apertures adapted for arrangement in coincidence with the gas passageways in said tip, said gasket comprising a disk of compressible material, and a shell of soft metal within which said disk of compressible material is arranged, said shell having a portion arranged to embrace a portion of said tip, and portions of the metal of said shell adjacent to the apertures formed through the gasket being forced into said apertures in a manner to provide metallic linings for said apertures.

5. In combination with a torch of the class described having a head portion and a tip having a plurality of gas passageways formed therethrough, a gasket interposed between said head portion and said tip and provided with a plurality of apertures adapted for arrangement in coincidence with the gas passageways in said tip, said gasket comprising a disk of compressible material and a shell of soft metal within which said disk of compressible material is arranged, said shell having a portion arranged to embrace a portion of said tip, and gasket positioning means for insuring proper registration of the apertures through the gasket with the gas passageways in said tip.

6. In combination with a torch of the class described having a head portion and a tip having a plurality of gas passageways formed therethrough, a gasket interposed between said head portion and said tip and provided with a plurality of apertures adapted for arrangement in coincidence with the gas passageways in said tip, said gasket comprising a disk of compressible material, and a shell of soft metal within which said disk of compressible material is arranged, and gasket positioning means for insuring proper registration of the apertures through the gasket with the gas passageways in said tip, said gasket positioning means comprising fingers on one of said members disposed in recesses arranged in the other of said members.

7. In combination with a torch of the class described having a head portion and a tip having a plurality of gas passageways formed therethrough, a gasket interposed between said head portion and said tip and provided with a plurality of apertures adapted for arrangement in coincidence with the gas passageways in said tip, said gasket comprising a disk of compressible material, and a shell of soft metal within which said disk of compressible material is arranged, and gasket positioning means for insuring proper registration of the apertures through the gasket with the gas passageways in said tip, said gasket positioning means comprising fingers on said gasket disposed in recesses formed in a face of said tip.

8. In combination with a torch of the class described having a head portion and a tip having a plurality of gas passageways formed therethrough, a gasket interposed between said head portion and said tip and provided with a plurality of apertures adapted for arrangement in coincidence with the gas passageways in said tip, said gasket comprising a disk of compressible material, and a shell of soft metal within which said disk of compressible material is arranged, and gasket positioning means for insuring proper registration of the apertures through the gasket with the gas passageways in said tip, said gasket positioning means comprising fingers on said gasket disposed in recesses formed in a face of said tip, and locking portions on said fingers arranged to engage portions of said tip to prevent accidental displacement of said gasket with respect to said tip.

9. In combination with a torch of the class described having a head portion and a tip having a plurality of gas passageways formed therethrough, a gasket interposed between said head portion and said tip and provided with a plurality of apertures adapted for arrangement in coincidence with the gas passageways in said tip, said gasket comprising a disk of compressible material, and a shell of soft metal within which said disk of compressible material is arranged, said shell having a portion arranged to embrace a portion of said tip, and gasket positioning means for insuring proper registration of the apertures formed through the gasket with the gas passageways in said tip, said gasket positioning means comprising fingers on said gasket disposed in recesses formed in a face of said tip, and locking portions on said fingers, said locking portions being extended into a depression in said tip to engage a wall of said depression and prevent accidental displacement of said gasket with respect to said tip.

10. A tip for a torch of the class described comprising an inner tip portion adapted for attachment to the torch, and provided with an oxygen passageway formed through said tip portion, an outer tip portion, said outer tip portion being attached to the inner tip portion, said inner tip portion and said outer tip portion being provided with gas passageways formed therein, and said gas passageways in said inner and outer tip portions communicating with a space within said outer tip portion which is interposed between said gas passageways in said inner and outer tip portions.

11. A tip for a torch of the class described comprising an inner tip portion adapted for attachment to the torch, and provided with an oxygen passageway formed through said tip portion, an outer tip portion, said outer tip portion being attached to the inner tip portion, said inner tip portion and said outer tip portion being provided with gas passageways formed therein, said gas passageways in said inner and outer tip portions communicating with a space within said outer tip portion which is interposed between said gas passageways in said inner and outer tip portions, and said gas passageways in said outer tip portion being arranged at an angle with respect to gas passageways formed in the inner tip portion.

12. A torch of the class described comprising a head portion, a nipple formed on said head portion, an annular member screwed on said nipple, a tip provided with a stem extended into a recess formed in said nipple, and a nut for securing said tip to said annular member, said annular member being provided with gas passageways formed therethrough, and said head portion being provided with a gas passageway with which the gas passageways in said annular member communicate, and said tip having gas passageways formed therein which are arranged in communication with said gas passageways in said annular member.

13. A torch of the class described comprising a head portion, a nipple formed on said head portion, an annular member screwed on said nipple, a tip provided with a stem extended into a recess formed in said nipple, and a nut for securing said tip to said annular member, said annular member being provided with gas passageways formed therethrough, and said head portion being provided with a tapering gas passageway with which the gas passageways in said annular member communicate, and said tip having gas passageways formed therein which are arranged in communication with said gas passageways in said annular member.

ARTHUR J. FAUSEK.
IRWING F. FAUSEK.